United States Patent [19]
Marquardt

[11] Patent Number: 5,729,533
[45] Date of Patent: Mar. 17, 1998

[54] TWO-SIDED, LIGHT-READABLE INFORMATION RECORDING DISC STACKS AND METHODS OF MAKING SAME

[75] Inventor: Richard C. Marquardt, Olyphant, Pa.

[73] Assignee: WAE Manufacturing Inc., Olyphant, Pa.

[21] Appl. No.: 579,302

[22] Filed: Dec. 27, 1995

Related U.S. Application Data

[60] Provisional application No. 60/003,610, Sep. 12, 1995.

[51] Int. Cl.[6] .................... G11B 3/70; G11B 7/26
[52] U.S. Cl. .................... 369/273; 369/284
[58] Field of Search ............... 369/286, 273, 369/282–284, 280, 103, 288; 360/131, 114, 134–135; 428/13, 64.3, 65.5, 76, 164, 323, 332, 336, 412, 416

[56] References Cited

U.S. PATENT DOCUMENTS

| | | | |
|---|---|---|---|
| 3,689,078 | 9/1972 | Ban | 369/273 |
| 4,629,668 | 12/1986 | Hamersley et al. | 430/11 |
| 4,967,286 | 10/1990 | Nomula et al. | 358/342 |
| 4,972,404 | 11/1990 | Yamaguchi et al. | 369/284 |
| 5,068,846 | 11/1991 | Kramer | 369/275.1 |
| 5,138,604 | 8/1992 | Umeda et al. | 369/103 |
| 5,398,231 | 3/1995 | Shin et al. | 369/275.4 |
| 5,470,627 | 11/1995 | Lee et al. | 369/283 |

FOREIGN PATENT DOCUMENTS

| | | | |
|---|---|---|---|
| 0 063 439 A1 | 10/1982 | European Pat. Off. | |
| 0 437 223 A2 | 7/1991 | European Pat. Off. | |
| 0514156 | 11/1992 | European Pat. Off. | 369/273 |
| 0 517 490 A2 | 12/1992 | European Pat. Off. | |
| 0 598 575 A2 | 5/1994 | European Pat. Off. | |
| 0 706 178 A2 | 4/1996 | European Pat. Off. | |
| 704843 | 4/1996 | European Pat. Off. | G11B 7/24 |
| 2 710 443 A1 | 3/1995 | France | |
| 5054599 | 3/1993 | Japan | |
| 8-194972 | 7/1996 | Japan | G11B 7/24 |
| 2203278 | 10/1988 | United Kingdom | |
| 95/04352 | 2/1995 | WIPO | G11B 7/00 |

OTHER PUBLICATIONS

F. Vizard, "Video's New Look", Popular Mechanics, May 1995, p. 32.

*Primary Examiner*—Allen Cao
*Attorney, Agent, or Firm*—Fish & Neave; Robert R. Jackson

[57] ABSTRACT

Recording media made up of two discs bonded together back to back have one disc on which programming information is recorded in light-readable form (generally similar to conventional CDs or CD-ROMs) and a second disc bearing visible indicia regarding the recording media. At least some of the visible indicia on the second disc are generic (i.e., are not specific to the particular programming on the other disc). These generic visible indicia are preferably formed on the second disc prior to the bonding of the two discs together. Additional visible indicia that are specific to the particular programming on the other disc may be added to the second disc. The visible indicia may be provided in several ways such as by "pit art", thermal branding, laser scribing, printing, labelling, etc. The second disc may also contain some recorded, generic, light-readable information such as "Wrong side—turn disc over."

4 Claims, 6 Drawing Sheets

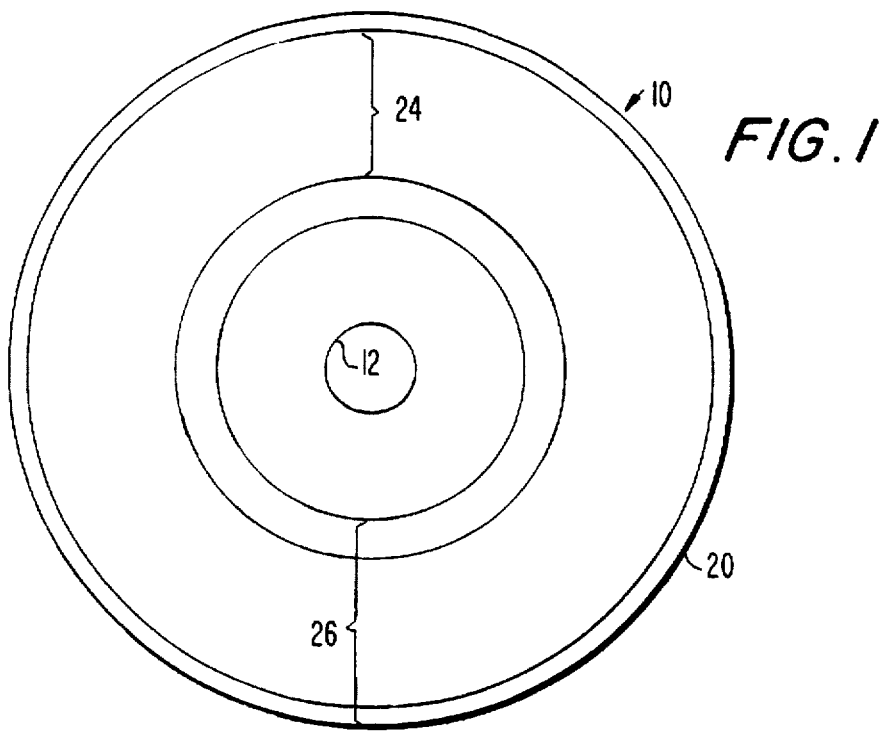
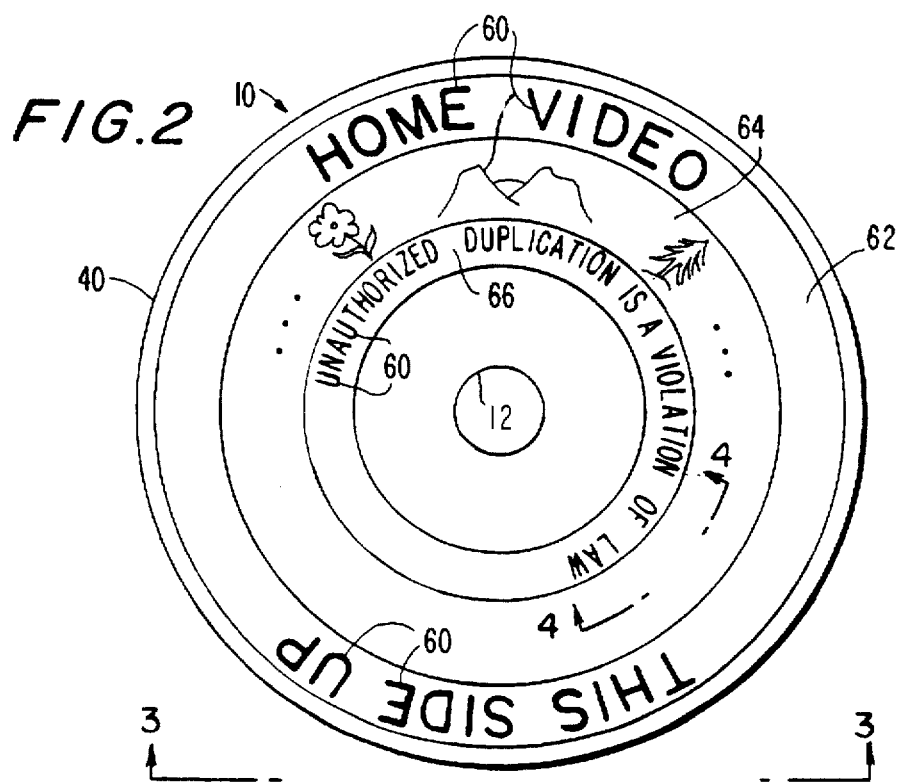

TWO-SIDED, LIGHT-READABLE INFORMATION RECORDING DISC STACKS AND METHODS OF MAKING SAME

This application claims the benefit of provisional application Ser. No. 60/003,610, filed Sep. 12, 1995.

BACKGROUND OF THE INVENTION

This invention relates to information recording media in the form of light-readable discs, and more particularly to such media which are made up of two such discs secured to one another back to back to form a two-sided stack.

Light-readable information recording media in the form of discs are well known as shown, for example, by Kramer U.S. Pat. No. 5,068,846. Commercially available compact discs ("CDs") and compact disc read-only memories ("CD-ROMs") are examples of recording media of this general type.

Recently there has been interest in using recording media of this type for recording other kinds of information such as movies or other similar real-time audio/visual programming. The information content of such programming is much greater per unit of real time than the information content of audio-only programming such as is now found on commercial CDs. In addition, movies or the like are often much longer than audio programming. A movie may run two hours or more, while it is very rare for any piece of music to run even as much as an hour. Discs that are substantially larger than audio CDs have been used for this type of programming, but these larger discs are unwieldy as compared to audio CDs, and it would be more convenient and commercially acceptable to use discs that are of the size of conventional audio CDs for this programming. Advances have been made in fitting more information onto discs of audio CD size. However, relatively long audio/visual programs still will not fit on one disc of conventional audio CD size. It has therefore been proposed to standardize on audio/visual programming discs that look somewhat like two conventional audio CDs that are bonded back to back in a stack. This doubles the playing time as compared to a single-sided disc, without significantly increasing the physical size of the disc structure as compared to a conventional audio CD.

While there is sufficient relatively long audio/visual programming to warrant standardizing on the two-sided disc stack described above, there is also a very large amount of potential programming that will fit entirely on one side of such a stack, with no need for any part of the programming to continue on to the second side as is required for longer programming. Nevertheless, for all disc structures to be physically the same (e.g., for physical compatibility in playback equipment) two back to back discs must always be provided. Thus, if the programming is relatively short, the second disc in such a stack may be "blank", i.e., with no real programming information recorded on it.

In view of the foregoing, it is an object of this invention to make use of the second disc in a two-disc stack of the type described above when the second disc is not needed to record programming information.

It is another object of this invention to provide improved methods for making two-disc stacks of the type described above when the second disc in the stack is not needed to record programming information.

SUMMARY OF THE INVENTION

These and other objects of the invention are accomplished in accordance with the principles of the invention by providing information recording media made up of two discs secured back to back in a two-disc stack. A first disc in the stack is constructed generally as shown in Kramer U.S. Pat. No. 5,068,846. This first disc therefore has light-readable programming information recorded on it in the known fashion. The second disc in the stack has no real programming information recorded on it, but it does bear some visually perceptible indicia. Preferably at least a portion of these indicia is generic (i.e., not specific to the particular programming on the first disc). For example, this generic portion of the visible indicia may include information identifying the manufacturer of the recording media and/or the general class of the programming on the first disc (e.g., a general movie theme or a general cartoon theme). Another portion of the visible indicia on the second disc may be specific to the programming on the first disc. For example, this second portion of the visible indicia may include the title of the programming on the first disc.

The visible indicia may be placed on the second disc in any of several different ways and at different times. For example, the visible indicia may be printed on the second disc. Or the visible indicia may be a label placed on the second disc. The visible indicia may be produced by modifying the surface of the second disc (e.g., by laser scribing, thermal branding, or the same technique that is used to record information on the first disc but with the pattern of the surface modifications having features that are large enough to be visible to the unaided eye). The visible indicia may be placed on the second disc before or after the first and second discs are bonded together. Or some of the visible indicia may be placed on the second disc before such bonding, while other visible indicia are placed on the disc after such bonding.

Although there is no real programming recorded on the second disc, some generic information may be recorded on that disc in the same light-readable form that the programming information is recorded on the first disc. For example, this generic digital information may cause playback apparatus to display a message such as "Wrong side—turn disc over."

In accordance with the methods of this invention, different "first discs" of the type described above are made with different programming recorded on them. "Second discs" of the type described above are made with generic information on them. This generic information may include the generic recorded information (e.g., the above-mentioned message "Wrong side—turn disc over") and/or generic visible indicia of the type described above. A second disc is then bonded to each first disc. In relatively close association with the bonding step (i.e., shortly before, during, or shortly after the bonding step) additional visible indicia may be added to the second disc that is specific to the programming on the first disc. This method allows generic second discs to be manufactured in advance and stockpiled until they are needed for bonding to many differently recorded first discs. This has several advantages such as helping to even out the workload of production machines and personnel, simplifying the operations required to produce finished two-stack discs, etc.

Further features of the invention, its nature and various advantages will be more apparent from the accompanying drawings and the following detailed description of the preferred embodiments.

BRIEF DESCRIPTION OF THE DRAWINGS

FIG. 1 is a simplified elevational view of one side of an illustrative recording medium constructed in accordance with this invention.

FIG. 2 is a simplified elevational view of the opposite side of the recording medium shown in FIG. 1.

DETAILED DESCRIPTION OF THE PREFERRED EMBODIMENTS

Figure 3:
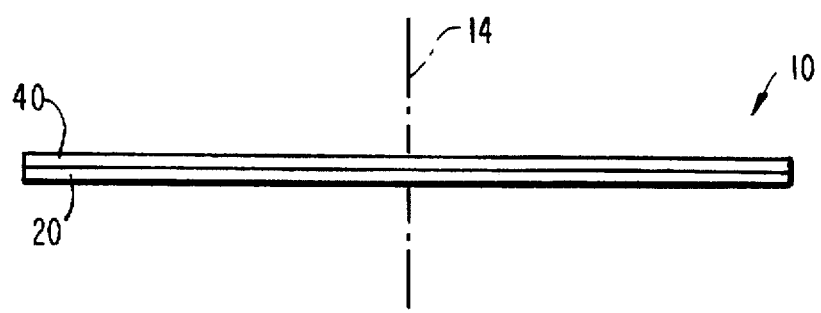
FIG. 3 is another simplified elevational view taken along the line 3—3 in FIG. 2.
Figure 4:
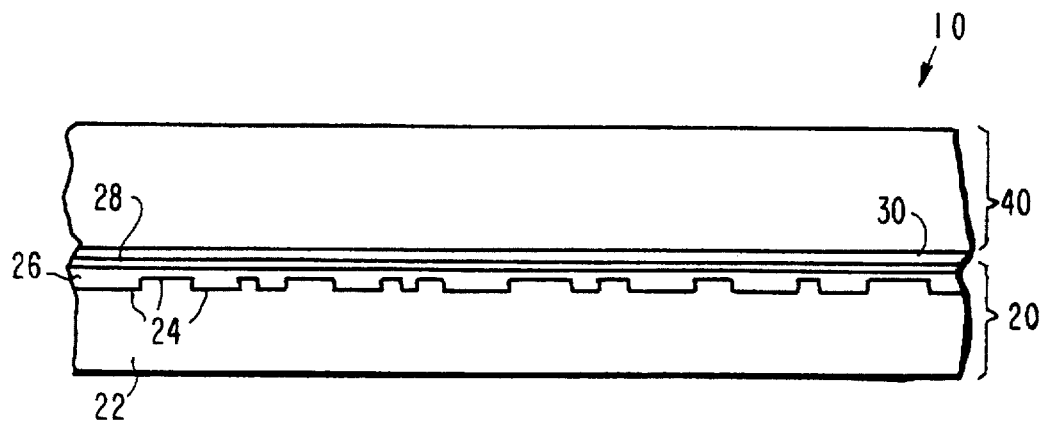
FIG. 4 is a simplified sectional view taken along the line 4—4 in FIG. 2.

As shown in FIGS. 1–4, an illustrative two-disc stack 10 made in accordance with this invention has first and second discs 20 and 40 bonded to one another back to back to form the stack. Each of discs 20 and 40 has a central aperture. In stack 10 these apertures line up with one another to form central stack aperture 12 by which the stack can be placed on a spindle to rotate it about axis 14 for playback of information recorded on the stack.

In stack 10 programming information is recorded on disc 20 in light-readable form in the conventional manner (e.g., generally as shown in Kramer U.S. Pat. No. 5,068,846). Thus disc 20 typically includes a transparent plastic disc 22, the upper surface of which (as viewed in FIG. 4) is patterned as shown at 24 to record programming information. The features of this pattern are sometimes referred to as "pits". These pits are arranged in concentric rings or a continuous spiral substantially concentric with axis 14. A layer 26 of highly reflective material such as aluminum is deposited on patterned surface 24. In this way light (typically laser light) directed in through disc 22 toward pattern 24 is reflected back out through disc 22 differently depending on whether the light strikes a high or low spot in pattern 24. The light thereby reads the programming information recorded by pattern 24 in order to play back that programming. The recording scheme may be digital.

To protect reflective layer 26 a resin layer 28 (e.g., a layer of lacquer) is deposited on the side of layer 26 which faces away from pattern 24.

Although the second disc 40 in stack 10 may have other constructions (described below), in the simplest case (illustrated by FIG. 4) disc 40 is a simple plastic disc 42, preferably of the same material as disc 22 and having substantially the same thickness as the combined thickness of components 22, 26, and 28. Disc 40 is bonded to the exposed surface of layer 28 (e.g., by means of a hot melt glue layer 30).

As shown in FIG. 2 disc 40 displays indicia 60 that are visible to the naked eye. In the particular example shown in FIG. 2 these indicia include the words "HOME VIDEO", "THIS SIDE UP", and "Unauthorized duplication is a violation of law", as well as an annular band 64 of artwork between the two annular bands 62 and 66 of text. Preferably at least some of these indicia are generic, i.e., not specific to the particular programming recorded on the first disc 20 in stack 10.

Figure 5:
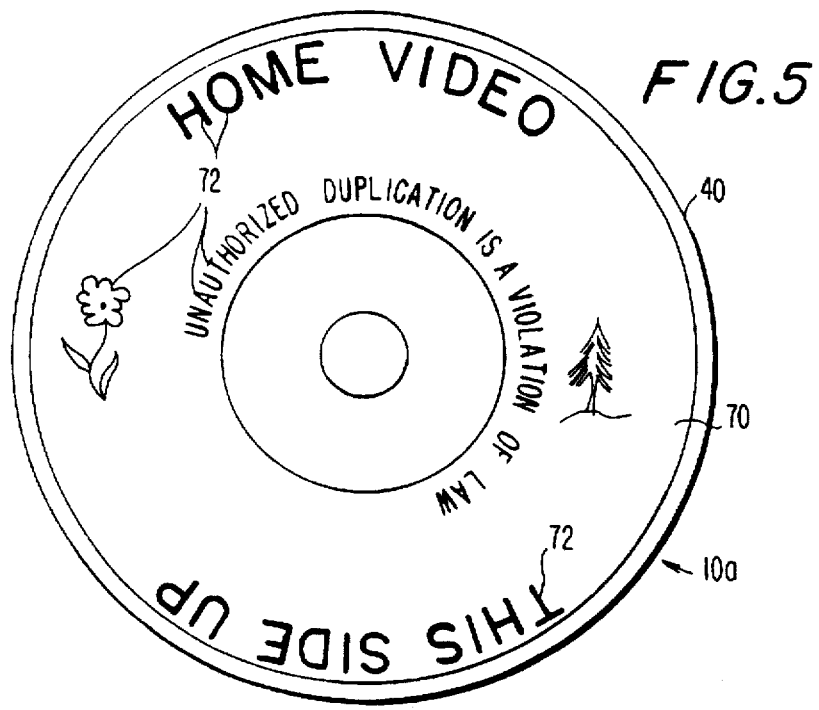
FIG. 5 is a view similar to FIG. 2 showing another illustrative embodiment of a recording medium constructed in accordance with this invention.

Indicia 60 can be applied to disc 40 in any of several ways. For example, indicia 60 can be printed on either side of disc 40 before discs 20 and 40 are bonded together. Or indicia 60 can be printed on the exposed surface of disc 40 after discs 20 and 40 have been bonded together (although it is preferred that at least the generic indicia are applied to disc 40 before bonding to disc 20.) As another example, a printed label (e.g., of paper) may be applied to the surface of disc 40 that is otherwise exposed in stack 10. Such a label may be applied either before or after discs 20 and 40 are bonded together, although it is again preferred that generic indicia are applied to disc 40 prior to bonding to disc 20. FIG. 5 shows an illustrative embodiment 10a in which visible indicia 72 are printed on an annular paper label 70 which is glued to the otherwise exposed surface of disc 40.

Figure 6:
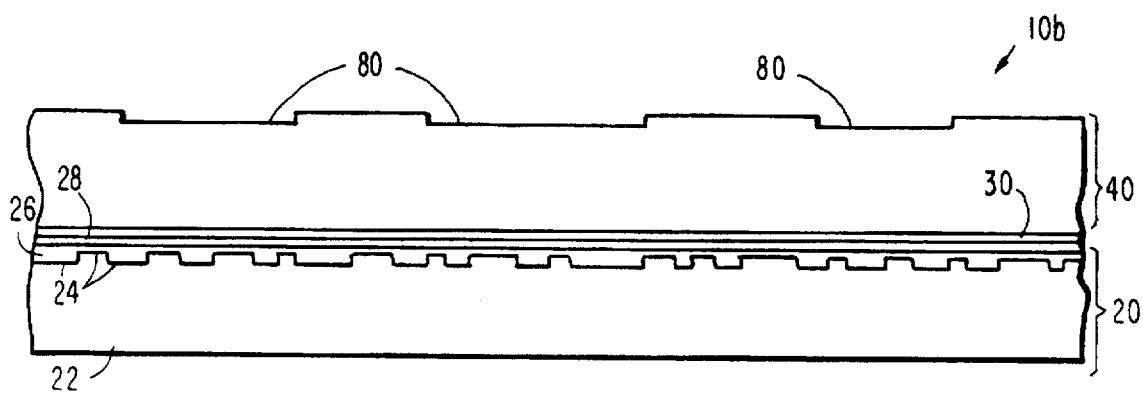
FIG. 6 is a view similar to FIG. 4 showing another illustrative embodiment of a recording medium constructed in accordance with this invention.

Still another way that visible indicia 60 may be applied to disc 40 is by locally modifying a surface of disc 40. In the illustrative alternative embodiment 10b shown in FIG. 6 the exposed surface of disc 40 is depressed as at locations 80 to provide visible indicia on the disc. These modifications of the surface of disc 40 may be produced in any of several ways such as by thermal branding (i.e., pressing a heated metal pattern against disc 40), by laser scribing, or by selective chemical etching. Again, this modification of the disc surface may be performed before, after, or even during bonding of discs 20 and 40 together, but it is preferred that generic indicia are applied to disc 40 prior to such bonding.

Figure 7:
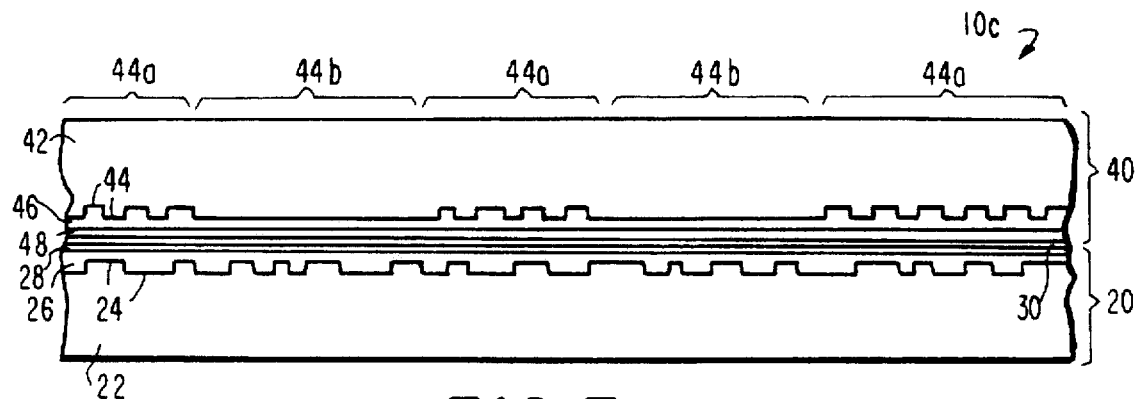
FIG. 7 is another view similar to FIG. 4 showing yet another illustrative embodiment of a recording medium constructed in accordance with this invention.

Another example of modifying a surface of disc 40 to provide visible indicia on that disc is shown in FIG. 7. In this embodiment technology similar to that used to record programming on disc 20 is used to provide visible indicia on disc 40. Thus in this embodiment disc 40 includes a transparent plastic disc 42 with a pattern 44 of surface modifications on one side. Pattern 44 is covered by a layer 46 of highly reflective material such as aluminum. Layer 46 is protected by a layer of lacquer 48. Pattern 44 includes at least two kinds of regions 44a and 44b. In regions 44a pattern 44 includes many small features (like pattern 24). In regions 44b, however, pattern 44 is smooth over relatively large areas. Light passing into disc 42 is reflected back through the disc visibly very differently depending on whether the reflection is from a region 44a or a region 44b. Regions 44a tend to scatter the light and therefore appear frosted, while regions 44b have a more mirror-like appearance. These visibly contrasting regions can be used to provide any desired visible indicia. For example, line work for lettering or to outline graphics can be provided by lines done like regions 44b against a background like regions 44a. Or lines done like regions 44a can be against a background done like regions 44b. Figures can be done with large areas like regions 44a against a background like regions 44b. Or a figure can be done with large areas like regions 44b against a background like regions 44a. Halftone-type shading can be provided by alternating regions like 44a and 44b. Visible indicia produced in this way are sometimes referred to herein as "pit art" because of the use of "pits" like those in pattern 24 to produce some of the features of the indicia.

Figure 8:
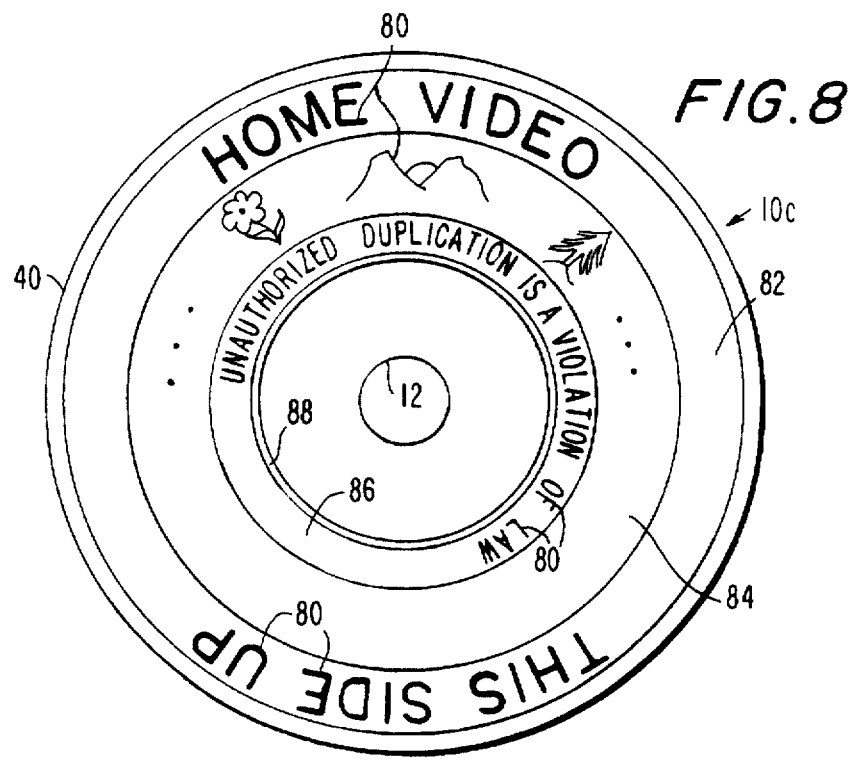
FIG. 8 is another view similar to FIG. 2 showing a possible additional feature of the embodiment shown in FIG. 7.

Constructing two-disc stack 10c as shown in FIG. 7 has the additional advantage that a portion of pattern 44 can be used to record some generic information that is light-readable for playback in the same way that the programming information can be played back from pattern 24. For example, FIG. 8 shows that in addition to visible indicia 80 in text bands 82 and 86 and graphics band 84, pattern 44 may include a small band 88 of generic light-readable information that causes the disc playback apparatus to display a generic message (e.g., "Wrong side—turn disc over") when band 88 is read in the same way that the playback apparatus would read pattern 24 on disc 20.

Figure 9:
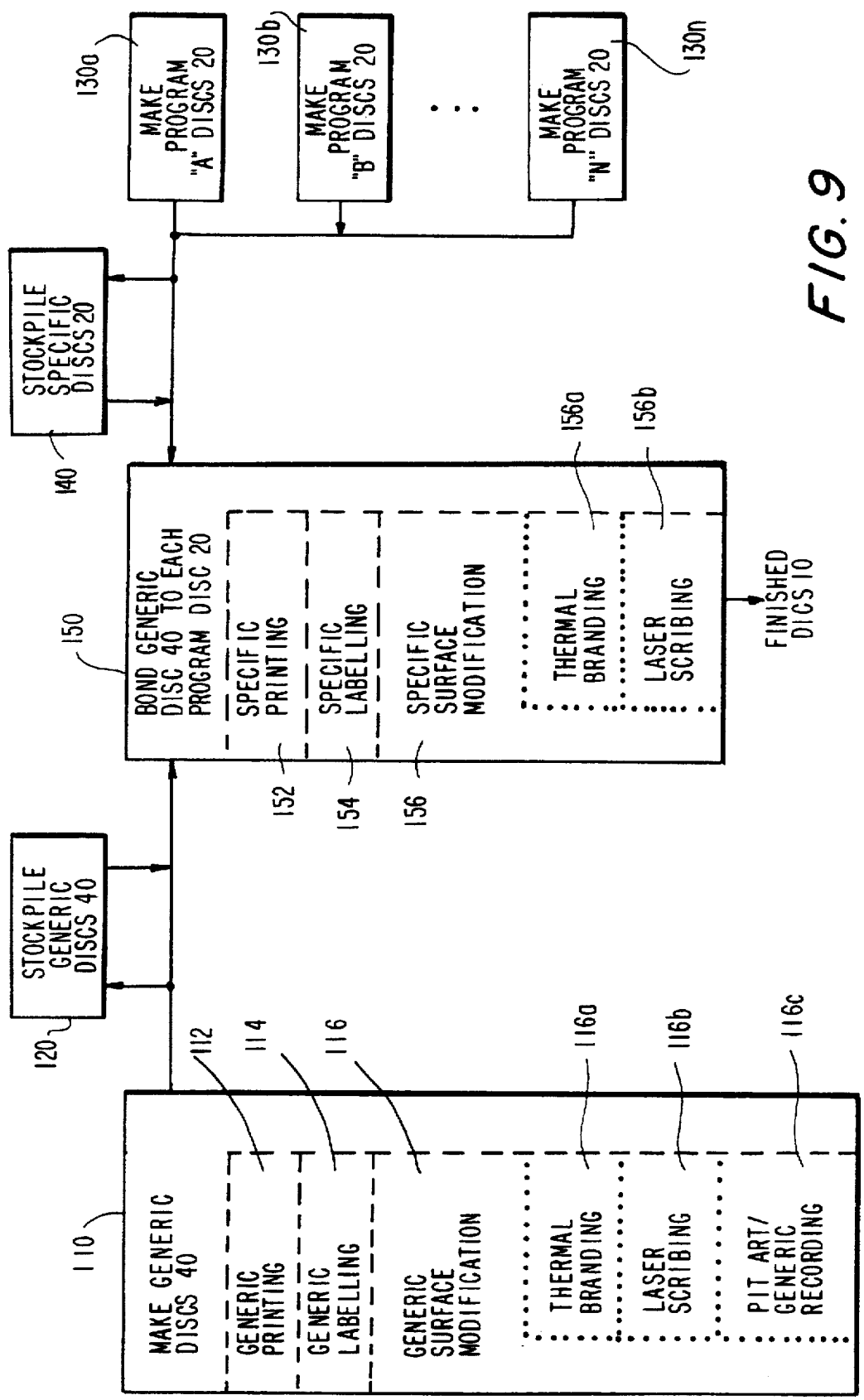
FIG. 9 is a simplified flow chart showing illustrative methods of making recording media in accordance with this invention.

FIG. 9 illustrates preferred methods of making discs 10 in accordance with this invention. In step 110 generic discs 40 are made (e.g., using apparatus of the general type that is conventionally used to make CDs or CD-ROMs). Step 110 may include one or more of substeps 112, 114, and 116. Substep 112 is the printing of generic visible indicia on each disc 40 as has been described above. Any of several printing techniques may be used such as silk screen printing or offset printing. Substep 114 is applying a label bearing generic visible indicia to each disc 40 as described above. Substep 116 is modifying a surface of each disc 40 to produce visible indicia on the disc. Substep 116 may be performed using one or more of further substeps 116a, 116b, and 116c. For example, further substep 116a is thermal branding; further substep 116b is laser scribing; and further substep 116c is the provision of pit art as is described above in connection with FIG. 7. (As mentioned above in connection with FIG. 8, step 116c may additionally or alternatively record a generic light-readable message (band 88) on each disc 40.)

Generic discs 40 leaving step 110 may go directly to step 150 or they may be stockpiled in step 120 for future use in step 150.

In step 130a program discs 20 recorded with programming information "A" are made (e.g., again using apparatus of the general type that is conventionally used to make CDs or CD-ROMs). For example, programming information "A" may be a science fiction film. In step 130b different discs 20 are made with different programming "B" recorded on them. For example, programming "B" may be a cartoon film. Additional different program discs 20 may be made with still other programming recorded on them in other steps 130 (e.g., in step 13on).

Program discs from step(s) 130 may go directly to step 150 or they may be stockpiled in step 140 for future use in step 150.

Figure 10:
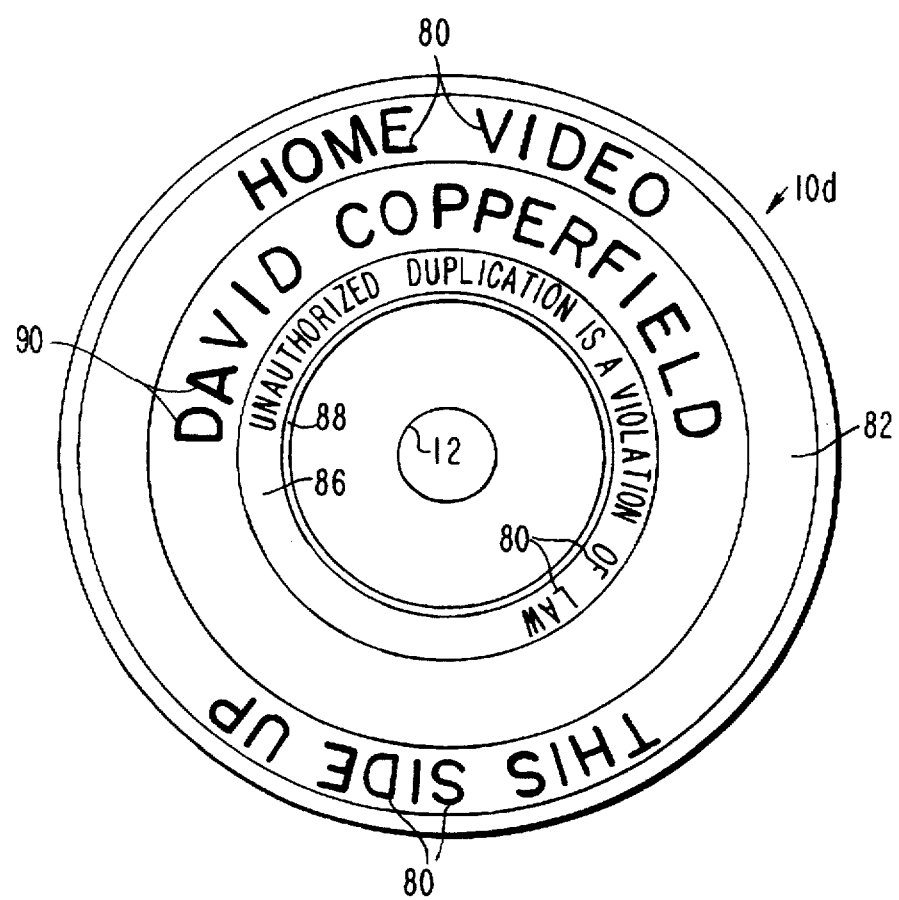
FIG. 10 is another view similar to FIG. 2 showing still another illustrative embodiment of a recording medium constructed in accordance with this invention.

When step 150 is performed, a generic disc 40 from step 110 or stockpile step 120 is bonded back to back with each program disc from a step 130 or from stockpile step 140. Step 150 may include one or more of substeps 152, 154, and 156 if it is desired to add specific visible indicia to discs 40. Such additional visible indicia are specific to the programming recorded on the disc 20 to which that disc 40 is bonded. For example, the additional specific visible indicia can be the title of the programming on the associated disc 20. An illustration of this is provided in FIG. 10 where the specific visible indicia 90 (i.e., "David Copperfield") is added to disc 40 in step 150 to identify the programming on the associated disc 20 as a movie entitled "David Copperfield". Substep 152 is a printing step similar to above-described step 112. Substep 154 is a labelling step similar to above-described labelling step 114. Substep 156 is a surface modification step similar to above-described step 116. Substep 156 may be performed by way of further substeps 156a and/or 156b, which are respectively similar to further substeps 116a and 116b. Substeps 152, 154, and/or 156 may be performed at any convenient time relative to the actual disc bonding portion of step 150. For example, substeps 152, 154, and/or 156 may be performed before or after discs 20 and 40 are bonded together in step 150. Substep 156a can be performed at either of these times, or it can be performed during the bonding of the discs as part of an operation that presses together the two discs being bonded.

The end products of step 150 are finished discs 10 (which is a generic reference to any of the various types of discs 10, 10a, 10b, 10c, and 10d shown in the other Figures).

Producing discs 10 using the methods illustrated by FIG. 9 has a number of advantages. For example, generic discs 40 can be made in large quantities in advance of the need for them to be bonded to discs 20. All or substantially all of the work that is needed on these discs 40 can be done on them in advance in step 110. If all the visible indicia that are needed are generic, step 150 can be just the extremely simple and rapid step of bonding two discs 20 and 40 together. Or even if some specific visible indicia are to be added in step 150, that visible indicia can be kept relatively simple and easy to apply because it is only an addition to more sophisticated generic indicia that have already been provided on each disc 40. In other words, the complicated artwork can be generic artwork done in advance in step 110, with only relatively simple specific artwork added later in step 150. In addition to possibly simplifying step 150, doing as much work as possible on discs 40 in step 110 in advance of the need for those discs helps smooth out the workload of production equipment and personnel.

It will be understood that the foregoing is only illustrative of the principles of this invention, and that various modifications can be made by those skilled in the art without departing from the scope and spirit of the invention. For example, protective lacquer layers 28 and 48 may not be needed since the back of each disc 20 or 40 is ultimately protected by the other disc bonded to that disc.

The invention claimed is:

1. An information recording medium comprising:

a first substantially transparent plastic disc having a first substantially planar surface and a second surface opposite to said first surface, said second surface having information recorded on it by means of local changes in the distance of said second surface from said first surface;

a first light reflecting coating on said second surface for reflecting light passed through said first disc back through said first disc, said first coating conforming to said local changes of said second surface so that said light is reflected back through said first disc in accordance with the information recorded by means of said local changes;

a second substantially transparent plastic disc of approximately the same thickness as said first disc, said second disc having opposite, substantially planar, third and fourth surfaces, said second disc being stacked on and secured to said first disc so that said third surface faces toward said second surface; and indicia on said second disc that are visible by viewing said fourth surface for visibly providing a user of said recording medium with identifying information related to the recording medium, said indicia being formed by means of variations in the thickness of the plastic of said second disc produced via local changes in the distance of said third surface from said fourth surface; wherein said indicia comprise local modifications of said third surface.

2. The recording medium defined in claim 1 further comprising:

a second visible light reflecting coating on said third surface for reflecting second visible light passed through said second disc back through said second disc, said second reflecting coating conforming to said local modifications of said third surface so that said second visible light is reflected back through said second disc in accordance with said local modifications.

3. The recording medium defined in claim 2 wherein said local modifications additionally comprise recording of additional information readable by the same means that said information recorded by means of said local changes is readable by.

4. The recording medium defined in claim 3 wherein said additional information indicates that said second disc is not the disc that contains said information recorded by means of said local changes.

* * * * *